Aug. 13, 1940.   W. E. MERRIMAN   2,211,343
PROJECTOR CIRCUIT
Filed April 23, 1938
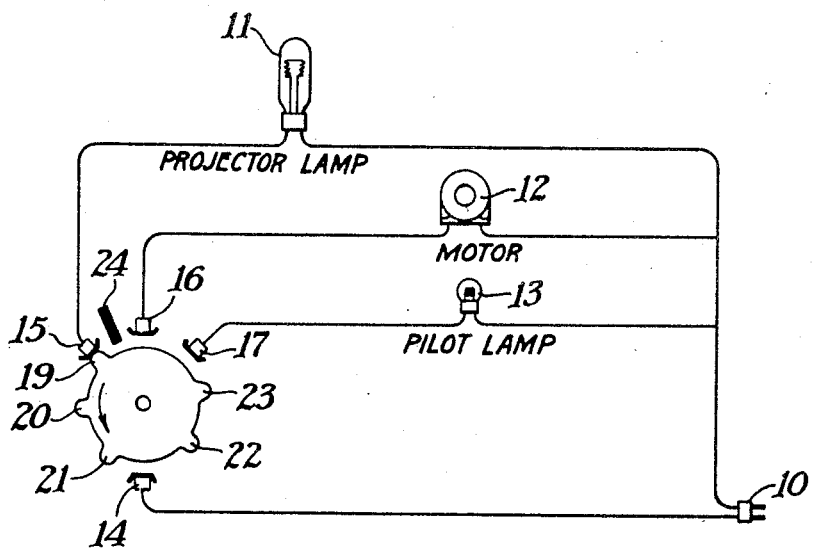
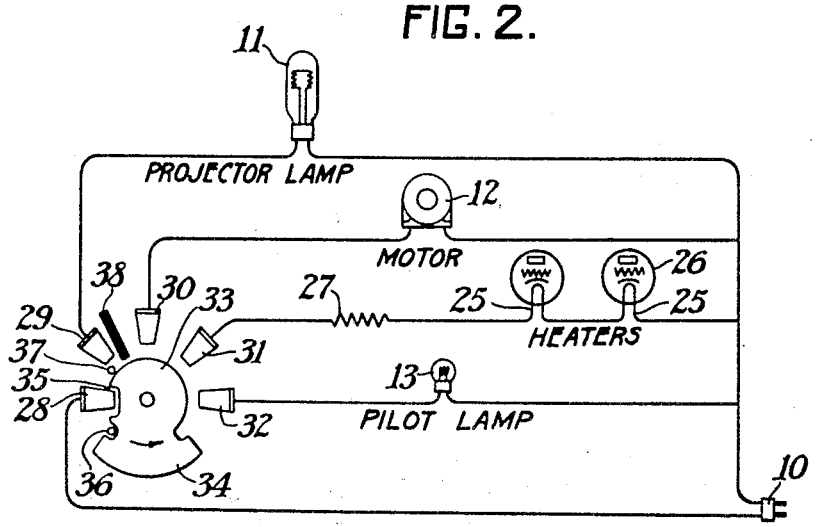
WILLIAM E. MERRIMAN
INVENTOR
BY
ATTORNEYS Patented Aug. 13, 1940

2,211,343

UNITED STATES PATENT OFFICE 2,211,343

PROJECTOR CIRCUIT

William E. Merriman, Rochester, N. Y., assignor to Eastman Kodak Company, Rochester, N. Y., a corporation of New Jersey Application April 23, 1938, Serial No. 203,894

6 Claims. (Cl. 88—16.2)

This invention relates to electric circuits for use with motion picture projectors, and particularly to a circuit for connecting the various elements of such a device to a source of electric power.

The electric features of a motion picture projector with which the present invention is concerned include a projector lamp usually of relatively high wattage, a motor for driving the film and if an air cooling system is used, for driving the fan, and a pilot lamp which illuminates part of the projector to aid in threading or in rewinding. In the projection of sound motion pictures, there is also an electric amplifier circuit including one or more electron discharge devices.

It is an object of the present invention to provide an electric circuit in which the various electric units will be connected in a predetermined and desired order. According to the invention, the pilot or thread lamp will be lighted first without the motor running or the projector lamp on so that the projector may be threaded. The motor will then be turned on before the projector lamp is turned on so that the film will be running, and there will be no danger of the film igniting or melting in the film gate. The pilot lamp is on when the motor is running for rewinding purposes. When the projector lamp is turned on the pilot lamp will be turned off so as to reduce unnecessary room illumination.

It is an object of the invention to provide all these features, and in the case of sound projectors to turn on the heaters of the electron discharge devices so that they will have time to warm up during the threading of the projector.

According to the invention an electric circuit is arranged to include the projector lamp, the motor, the pilot lamp, and a multiple position switch. The projector lamp, the motor, and the pilot lamp are connected in parallel to a lead which is adapted to be connected to one side of a power source and the switch includes a series of contacts one of which is a supply contact connected to a lead which is adapted to be connected to the other side of the power source. Three of the switch contacts are connected respectively to the pilot lamp, the motor and the projector lamp and are successively engaged by a rotating contactor so that in one position the supply contact is connected to the pilot lamp, in another position the supply contact is connected to the projector lamp and the motor contacts, but not to the pilot lamp and in an intermediate position the supply contact is connected to the pilot lamp and motor contacts but not to the projector lamp contact. The switch may also be provided with an "off" position so arranged that as the switch is turned from the off position, the pilot lamp alone, then the pilot lamp and motor and finally the motor and projector lamp are turned on in the order named.

In case of a sound projector the order starting from the off position is as follows: the pilot lamp alone, the pilot lamp and heaters, the pilot lamp, heaters, and motor, and finally the heaters, the motor, and the projector lamp without the pilot lamp.

In the preferred embodiment of the invention, the rotating contactor is entirely insulated from the supply contact when in the off position. Furthermore, it is desirable to provide an arc-over guard near the projector lamp contact because of the relatively high wattage carried by this branch of the circuit.

Other objects and advantages of the present invention will be apparent from the following description when read in connection with the accompanying drawing, in which:

Fig. 1 shows one embodiment of the invention for a silent projector.

Fig. 2 shows a similar embodiment for a sound projector.

In Fig. 1, a projector lamp 11, a motor 12, and a pilot lamp 13 are connected in parallel to one side of an electric plug 10 which is adapted to be connected to a power supply. The other side of the electric plug 10 is connected to a supply contact 14 of a rotary switch which includes a contact 15 connected to the projector lamp, a contact 16 connected with the motor and a contact 17 connected to the pilot lamp. A rotating contactor 18 shown in the "off" position has a series of contact points 19, 20, 21, 22, and 23 adapted to engage the contacts. In the position shown the contactor 18 is prevented from further clockwise motion by a detent (not shown) and is permitted to rotate counter-clockwise as indicated by the arrow. Rotating the contactor to the first "on" position which requires one-eighth of a turn, brings the point 21 into engagement with the contact 14 and point 23 engages the contact 17 turning on the pilot lamp 15. Another eighth of a turn to the second position brings the point 20 into engagement with the contact 14, the point 23 engages the contact 16 and the point 22 engages the contact 17 turning on both the pilot lamp and the motor. Another eighth of a turn to the third and last position brings the point 19 into engagement with the contact 14, the point 23 into engagement with the contact 15 and the point 22 into engagement with the contact 16, so that the motor and projector lamp are turned on but the pilot lamp is turned off. Further counter-clockwise rotation of the contactor is prevented by a detent in the usual manner. When the projector lamp is turned off by rotating the contactor 18 clockwise from this last mentioned position, the possibility of an arc-over between the contact 15 and the point 23 which has moved to engagement with the contact 16, is eliminated by the provision of an arc-over guard 24.

A similar arrangement shown in Fig. 2 includes a circuit for turning on the heaters 25 of the electron discharge devices 26 used in the amplifier of a sound reproducer circuit, in parallel with the pilot lamp, motor and projector lamp circuits. A resistance 27 may be included so that the potential drop across each heater 25 is correct. In this figure the multiple position switch includes a disk shaped contactor 33 having a peripheral portion 34 which is gripped on opposite sides by the contacts. The supply contact 28 similarly grips the inner portion of the disk 33 when it is rotated. Contacts 29, 30, 31, and 32 are connected respectively to the projector lamp, the motor, the heaters and pilot lamp. The disk 33 is provided with a cut away portion 35 so that in the off position the supply contact 28 is entirely insulated therefrom. A stop 36 is provided to limit the clockwise motion of the contactor 33 at the off position and a similar stop 37 is provided to limit the counter-clockwise motion of the contactor 33. An arc-over guard 38 near the projector lamp contact is provided with a slot through which the portion 34 may move. It is also possible to have the contactor 33 made of two portions to grip the contacts on opposite sides instead of the contacts gripping a disc contactor. In this case the projector lamp contact may be mounted on one side of an insulating ring and engaged only from the top and the motor contact may be mounted on the other side of the ring and engaged by the corresponding grip only from the bottom. Thus the support for the contacts in the insulating ring acts as the arc-over guard.

Having thus described the invention and two preferred embodiments thereof I wish to point out that it is not limited to the specific arrangements shown but is of the scope of the appended claims.

What I claim and desire to secure by Letters Patent of the United States is:

1. An electric circuit adapted to connect a motion picture projector to a power supply, said circuit comprising a projector lamp, a motor for driving the film, a pilot lamp for illuminating part of the projector mechanism, conducting means for connecting the projector lamp, the motor and the pilot lamp in parallel to one side of the power supply and a multiple position rotary switch for completing the circuit from the other side of the power supply to the projector lamp, motor and pilot lamp, said switch comprising four circumferentially located contacts one of which is a supply contact connected to a lead adapted to be connected to said other side of the power supply and three of which are connected respectively to the pilot lamp, the motor and the projector lamp and a rotating contactor consisting of an electrically unitary piece of metal for engaging the several contacts and means for rotating the piece of metal for connecting predetermined sets of contacts, said contactor in one position connecting the supply contact and the pilot lamp contact, in another position connecting the supply contact, the projector lamp contact and the motor contact but not the pilot lamp contact and in an intermediate position connecting the supply contact, the pilot lamp contact and the motor contact but not the projector lamp contact.

2. An electric circuit adapted to connect a motion picture projector to a power supply, said circuit comprising a projector lamp, a motor for driving the film, a pilot lamp for illuminating part of the projector mechanism, conducting means for connecting the projector lamp, the motor and the pilot lamp in parallel to one side of the power supply and a multiple position rotary switch for completing the circuit from the other side of the power supply to the projector lamp, motor and pilot lamp, said switch comprising four circumferentially located contacts one of which is a supply contact connected to a lead adapted to be connected to said other side of the power supply and three of which are connected respectively to the pilot lamp, the motor and the projector lamp and a rotating contactor consisting of an electrically unitary piece of metal for engaging the several contacts and means for rotating the piece of metal for connecting predetermined sets of contacts, said contactor in one position connecting the supply contact and the pilot lamp contact, in another position connecting the supply contact, the projector lamp contact and the motor contact but not the pilot lamp contact and in an intermediate position connecting the supply contact, the pilot lamp contact and the motor contact but not the projector lamp contact, said switch also comprising an arc guard adjacent to the projector lamp contact for preventing arc over as the contactor is moved from said another position to said intermediate position.

3. An electric circuit adapted to connect a motion picture projector to a power supply, said circuit comprising a projector lamp, a motor for driving the film, a pilot lamp for illuminating part of the projector mechanism, conducting means for connecting the projector lamp, the motor and the pilot lamp in parallel to one side of the power supply and a multiple position rotary switch for completing the circuit from the other side of the power supply to the projector lamp, motor and pilot lamp, said switch comprising four circumferential located contacts one of which is a supply contact connected to a lead adapted to be connected to said other side of the power supply, the one next adjacent thereto on the circumference being connected to the pilot lamp, the third one being connected to the motor and the fourth one being connected to the projector lamp, and a rotating contactor consisting of an electrically unitary piece of metal for engaging the several contacts and means for rotating the piece of metal for connecting predetermined sets of contacts, said contactor in one position connecting the supply contact and the pilot lamp contact, in another position connecting the supply contact, the projector lamp contact and the motor contact but not the pilot lamp contact and in an intermediate position connecting the supply contact, the pilot lamp contact and the motor contact but not the projector lamp contact.

4. An electric circuit adapted to connect a projector for motion picture film to a power supply, which circuit comprises a projector lamp, a motor for driving the film, a pilot lamp for illuminating part of the projector mechanism, conducting leads connecting the projector lamp, the motor and the pilot lamp in parallel to a lead which is adapted to be connected to one side of the power supply and a multiple position rotary switch having four circumferentially located contacts one of which is a supply contact connected to a lead which is adapted to be connected to the other side of the power supply and three of which are connected respectively to the pilot lamp, the motor and the projector lamp, said switch also having a rotating contactor with a single piece of metal for engaging the several contacts and means for rotating the piece of metal which in one position is insulated from the supply contact, in another position connects the supply contact, the projector lamp contact and the motor contact but not the pilot lamp contact, in a third position intermediate to the first-mentioned two, connects the supply contact, the motor contact and the pilot lamp contact but not the projector lamp contact and in a fourth position intermediate to the first and third mentioned positions connects the supply contact to the pilot lamp contact only.

5. An electric circuit adapted to connect a projector for motion picture film to a power source which circuit comprises a projector lamp, a motor for driving the film, a pilot lamp for illuminating part of the projector mechanism, conductors adapted to connect the projector lamp, the motor and the pilot lamp in parallel to one side of the power supply and a rotary switch having a four position rotating contactor, four contacts one of which is connected to a lead which is adapted to be connected to the other side of the power supply and the other three are connected to the pilot lamp, the motor and the projector lamp respectively, a single piece of metal for engaging the several contacts and means for rotating the piece of metal said rotating contactor in one extreme position being insulated from the supply contact, in the next and second position connecting the supply and pilot lamp contacts only, in the third position connecting the supply, pilot lamp and motor contacts only and in the other extreme position connecting the supply, motor and projector lamp contacts only.

6. An electric circuit adapted to connect a motion picture projector having a sound reproducer associated therewith to a power supply, which circuit comprises a projector lamp, a motor for driving the film, at least one hot cathode electron discharge device for amplifying an electric signal bearing the sound to be reproduced, means for heating the cathode, a pilot lamp for illuminating part of the projector, conducting means connecting the projector lamp, the motor, the heating means and the pilot lamp in parallel to a lead adapted to be connected to one side of the power supply and a multiple position rotary switch having a contact connected to a lead adapted to be connected to the other side of the power supply, four other circumferentially located contacts connected respectively to the projector lamp, the motor, the heating means and the pilot lamp, and a rotating contactor including a single piece of metal for engaging the several contacts and means for rotating the piece of metal which in its first position is insulated from the supply contact, in its second position connects the supply contact to the pilot lamp only, in its third position connects the supply contact to the pilot lamp and the heating means only, in its fourth position connects the supply contact to the pilot lamp, the heating means and the motor but not to the projector lamp and in its fifth position connects the supply contact to the heating means, the motor and the projector lamp but not to the pilot lamp.

WILLIAM E. MERRIMAN.